United States Patent

Looschen

[15] 3,691,555

[45] Sept. 12, 1972

[54] ELECTRONIC KEYBOARD

[72] Inventor: Floyd W. Looschen, Arcadia, Calif.

[73] Assignee: Burroughs Corporation, Detroit, Mich.

[22] Filed: March 30, 1970

[21] Appl. No.: 23,712

[52] U.S. Cl. ....................340/365, 340/345

[51] Int. Cl. ....................G08c 1/00

[58] Field of Search.......340/365, 166, 172.5, 258 C, 340/345, 337; 235/128; 178/81; 197/98, 100; 317/146

[56] References Cited

UNITED STATES PATENTS

| | | | |
|---|---|---|---|
| 2,659,533 | 11/1953 | Quinby et al. | 340/365 |
| 3,129,418 | 4/1964 | De La Tour | 340/166 |
| 3,257,658 | 6/1966 | Lloyd | 340/365 |
| 3,482,241 | 12/1969 | Johnson | 340/365 |
| 3,538,256 | 11/1970 | Lucas | 340/365 |
| 3,207,905 | 9/1965 | Bray | 340/365 |

OTHER PUBLICATIONS

IBM Technical Disclosure Bulletins, " A Non-Mechanical Keyboard," W. A. Goddard, Vol. 6, No. 11, April 1964, p. 12.

IBM Technical Disclosure Bulletin, " Non-Mechanical Keyboard," W. A. Goddard, Vol. 3, No. 11, April 1961, p. 31.

*Primary Examiner*—Robert L. Griffin
*Assistant Examiner*—John C. Martin
*Attorney*—Christie, Parker & Hale

[57] ABSTRACT

An all-electronic keyboard avoiding mechanical motion of keys, and particularly suitable for digital computer input is described. The keyboard has a matrix of keys located at intersections of columns and rows and electronic oscillations are established in circuits including keys of the keyboard. When an individual key is contacted manually, the change in capacitance detunes the oscillating circuit in the column and row in which the selected key lies. Electronic sensors and decoders note the column and row involved and provide a signal unique to the key touched. In one embodiment a separate oscillator is employed for each line of the matrix, and in another embodiment a single oscillator is employed for the entire matrix. Geometrical arrangements of conductors on individual keys are described with the branches of forked conductors interlaced for capacitive coupling. In one embodiment an additional conductor is sinuously interposed between branches of a pair of forked conductors.

9 Claims, 8 Drawing Figures

INVENTOR.
FLOYD W. LOOSCHEN
BY
Christie, Parker & Hale
ATTORNEYS

PATENTED SEP 12 1972

3,691,555

SHEET 2 OF 5

ELECTRONIC KEYBOARD

BACKGROUND

In the operation of computers, particularly digital computers, a keyboard for insertion of numerical values and other alphanumeric information is highly desirable and almost uniformly employed. Previously, these computer inputs have employed mechanical arrangements wherein a keyboard similar to a typewriter keyboard, having a great number of mechanical parts, is employed. In these keyboards it is necessary for the key to be stroked or manually displaced in order to generate an output signal. With such an arrangement, mechanical linkages, springs, adjustable touch controls, and electrical switches are required for each key. This proliferation of mechanical parts leads to performance and reliability problems, and also involves substantial expense due both to the large number and variety of special parts that must be fabricated to build such a keyboard, and to the attendant assembly costs.

In the mechanical keyboards, the stroking or displacement of the keys must be converted to an electrical signal since the computer operates only on electrical signals. Normally, the actuation of the key is converted to a digital signal, which then can be handled by conventional computer logic. Since the computer operates on electronic signals, it is highly desirable to have an all-electronic keyboard in which there is no requirement for converting mechanical motions of keys to electronic signals. The elements required for such an all-electronic keyboard are simple, reliable and inexpensive, and the manufacturing techniques required for forming such a keyboard are straightforward, conventional techniques widely used in the electronics industry, and hence quite inexpensive. An all-electronic keyboard is also desirable since the operating speed can be quite high and is in no way limited by the speed at which mechanical elements, such as displaceable keys, can be operated.

SUMMARY OF THE INVENTION

Thus, there is provided in practice of this invention according to a preferred embodiment an electronic keyboard having a matrix of keys in a plurality of columns and rows with oscillations established in the columns and rows. Each of the keys includes means for changing the oscillation when the key is manually touched and sensors detect the column and row in which the touched key lies to provide a signal uniquely characteristic of the touched key. A key structure having forked conductors with interlaced branches provides capacitive coupling when the key is touched. If desired, a third conductor can be sinuously interposed between branches of the two forked conductors.

DRAWINGS

Objects and many of the attendant advantages of this invention will be appreciated as the same becomes better understood by reference to the following detailed description when considered in connection with the accompanying drawings wherein.

Throughout the drawings like reference numerals refer to like parts.

DESCRIPTION

Figure 1:
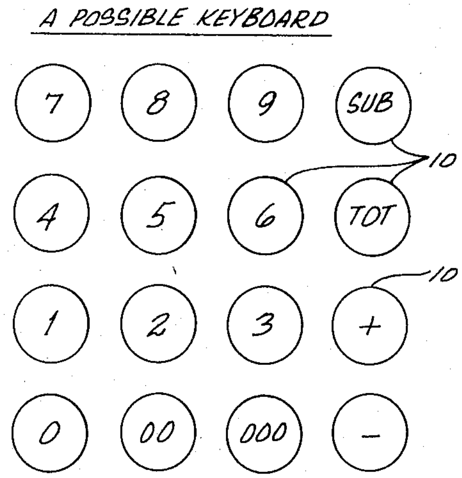
FIG. 1 illustrates a typical keyboard arrangement.

FIG. 1 illustrates a possible keyboard arrangement for a computer input or the like, constructed according to principles of this invention. As illustrated in this embodiment, a plurality of keys 10 are arranged in a rectangular matrix of columns and rows in substantially the same manner found in a conventional 10-key adding machine. Thus, for example, the keys with indicia 0, 1, 4 and 7 are arranged in a column and the keys with indicia 1, 2, 3 and + are arranged in a row. It will be recognized, of course, that the key arrangement resembles existing keyboard arrangements, but the keys themselves are a portion of an electronic keyboard as hereinafter described in greater detail and not mechanically displaceable. It will also be apparent that many other keyboard arrangements, such as, for example, a conventional typewriter keyboard arrangement, can be employed for inserting alphanumeric information into a computer. It will also be apparent that the matrix need not be rectangular, as illustrated in FIG. 1, but can be skewed as in a conventional typewriter keyboard or can involve other arrangements of columns and rows.

As used herein, the term "line" is employed as generic to columns and rows, and may refer to either a column or row when the structure involved is substantially similar. It will be apparent, of course, that the terms "column" and "row" are related to directions in the matrix, and do not necessarily bear any relation to a physical direction.

Figure 2:
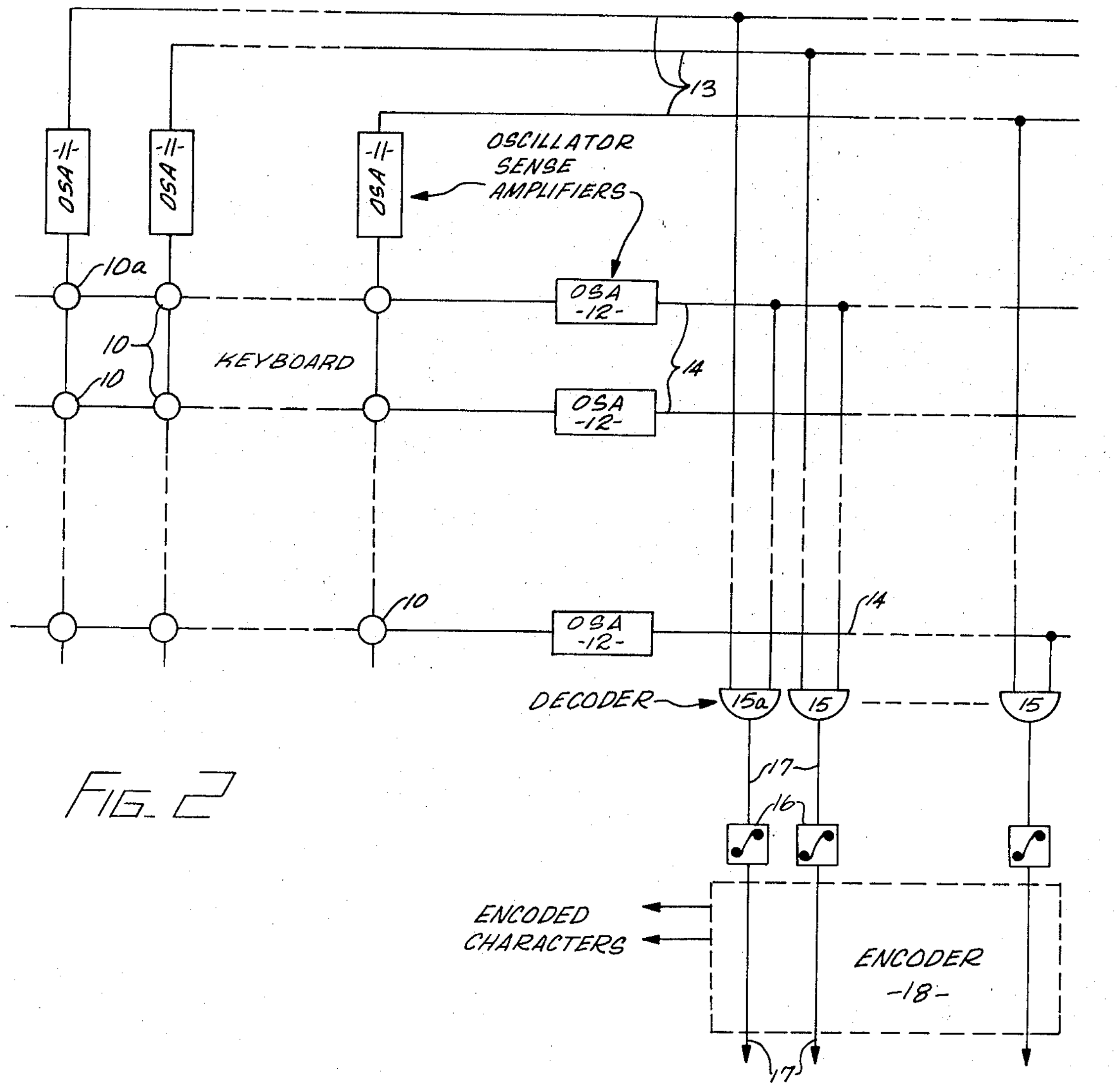
FIG. 2 illustrates schematically an electronic and logic arrangement for the keyboard of FIG. 1 constructed according to principles of this invention.

FIG. 2 illustrates schematically an electronic and logic arrangement for a keyboard such as illustrated in FIG. 1 and constructed according to principles of this invention. As illustrated in this embodiment, all of the keys 10 in each column are electrically coupled to an oscillator sense amplifier 11. Likewise, all of the keys 10 in each row are connected to an oscillator sense amplifier 12. Thus, there are a plurality of oscillator sense amplifiers with one amplifier for each line of the matrix.

The oscillator sense amplifiers are conventional circuits, such as described hereinafter in relation to FIG. 8 which oscillate at a selected frequency when matched with an external circuit which is part of the oscillating network. When the oscillation network changes the oscillator sense amplifier changes it output signal. In the illustrated arrangement, the several keys in a line of the matrix and the interconnection therebetween forms a portion of the oscillating network along with the oscillator sense amplifier for that line.

An output connection 13 is provided for each column oscillator sense amplifier 11. Likewise, an output connection 14 is provided for each row oscillator sense amplifier 12. The output of the oscillator sense amplifier for each line is a voltage signal which has a selected magnitude when the network is oscillating and a different magnitude when the network is not oscillating at the selected frequency. Thus, for example, the voltage output can be substantially zero when the oscillator sense amplifier network is in oscillation, and a plus voltage when the oscillator sense amplifier network is not oscillating. By properly selecting the amplification level and bias any desired voltage levels may be provided for distinguishing the oscillating condition from the non-oscillating condition. Since two distinct voltage levels are present as oscillator sense amplifier outputs, it will be apparent that these signals can readily be employed as true and false states, respectively, for a digital machine.

The individual keys 10 of the electronic keyboard are constructed as hereinafter described in greater detail so that the connection from the oscillator sense amplifier to the several keys in a line is adjacent the front or upper surface of the key. As is well known, the human body is a conductor and a substantial electrical ground. When an operator's finger closely approaches or touches the surface of a key the capacitive coupling between the finger of the operator and the electrical conductor of the oscillating network serves to detune or disable the oscillator so long as the capacitive coupling to the body's ground persists, and the oscillator sense amplifier for the line ceases to oscillate at the selected frequency. By employing a frequency of oscillation of about 10 megacycles, a high degree of sensitivity to the capacitive coupling with a human finger is obtained. The degree of sensitivity to area of contact or closeness of contact can readily be adjusted by proper selection or adjustment of the Q or gain of the oscillator sense amplifiers.

As pointed out hereinabove, each key 10 is electrically coupled to an oscillator sense amplifier 11 in one column of the matrix, and an oscillator sense amplifier 12 in one row of the matrix. Thus, each key is characterized by a unique pair of oscillator sense amplifiers, one for a column and one for a row.

The outputs 13 of each of the column oscillator sense amplifiers is connected to a plurality of decoders 15 which are merely conventional AND gates. The total number of decoders corresponds to the number of keys 10 in the matrix. Each of the outputs 13 is connected to a number of decoders corresponding to the number of rows in the matrix. In the illustrated embodiment, each decoder 15 has a connection to only one of the column outputs 13. Likewise, the output 14 of the oscillator sense amplifier for each row is connected to a plurality of the decoders 15. The number of decoders to which the row connection is made corresponds to the number of columns in the matrix, and each decoder is connected to the output 14 of only one of the rows.

Thus, each decoder 15 is connected to one column and one row of the matrix, and no two decoders are connected to the same pair of column and row. Each decoder is, therefore, uniquely associated with a particular key 10 in the matrix on the keyboard. Thus, for example, the key **10*a* in the first column and the first row of the illustrated matrix is connected to the first decoder 15*a* in both column and row connections. The first key 10*a* is also connected by way of the column oscillator sense amplifier 11 to a number of other decoders 15, and is also connected by way of the row oscillator sense amplifier 12 to a different plurality of decoders 15. Thus, for example, when the key 10*a* is touched, the corresponding oscillator sense amplifiers 11 and 12 will both go out of oscillation and a true signal will appear on the respective output connections 13 and 14. These are, in turn, inputs to the AND gate 15*a* which will, therefore, be true. Since none of the other AND gates have both inputs true, they will remain false. Thus, the output of the first AND gate 15*a* is uniquely characteristic of the condition of the first key 10*a*. If desired, an additional input can be provided to additional decoders 15** to obtain the shift function found on conventional typewriters. Other logic arrangements will also be apparent to one skilled in the art for obtaining multiple functions from the keys in the matrix.

The output of each of the decoders 15 is applied to a separate integrator 16. The integrators 16 effectively act as time delay filters so that a true signal is given only if the corresponding key is touched for a liminal time interval greater than some minimum selected value. This minimizes spurious signals due to transient changes in the oscillation of networks due to something other than operator contact with a key. Clearly the time threshold is readily selected or adjusted as desired to minimize interference from transient noise and yet maintain high speed operation.

The output 17 from the integrators 16 can be applied directly to flip-flops (not shown) or the like for setting, resetting or other direct control. Such connections and logic arrangements for effecting control of such connections are conventional and not illustrated herein. The outputs of the integrators 16 are also connected to a conventional encoder 18 which translates the signals on the several input connections 17 into a conventional digital code. The conventional six-bit binary code may, for example, be employed for identifying the usual letters and numerals. The output of the encoder is thus of the usual binary form and is readily employed in a conventional digital machine.

Figure 3:
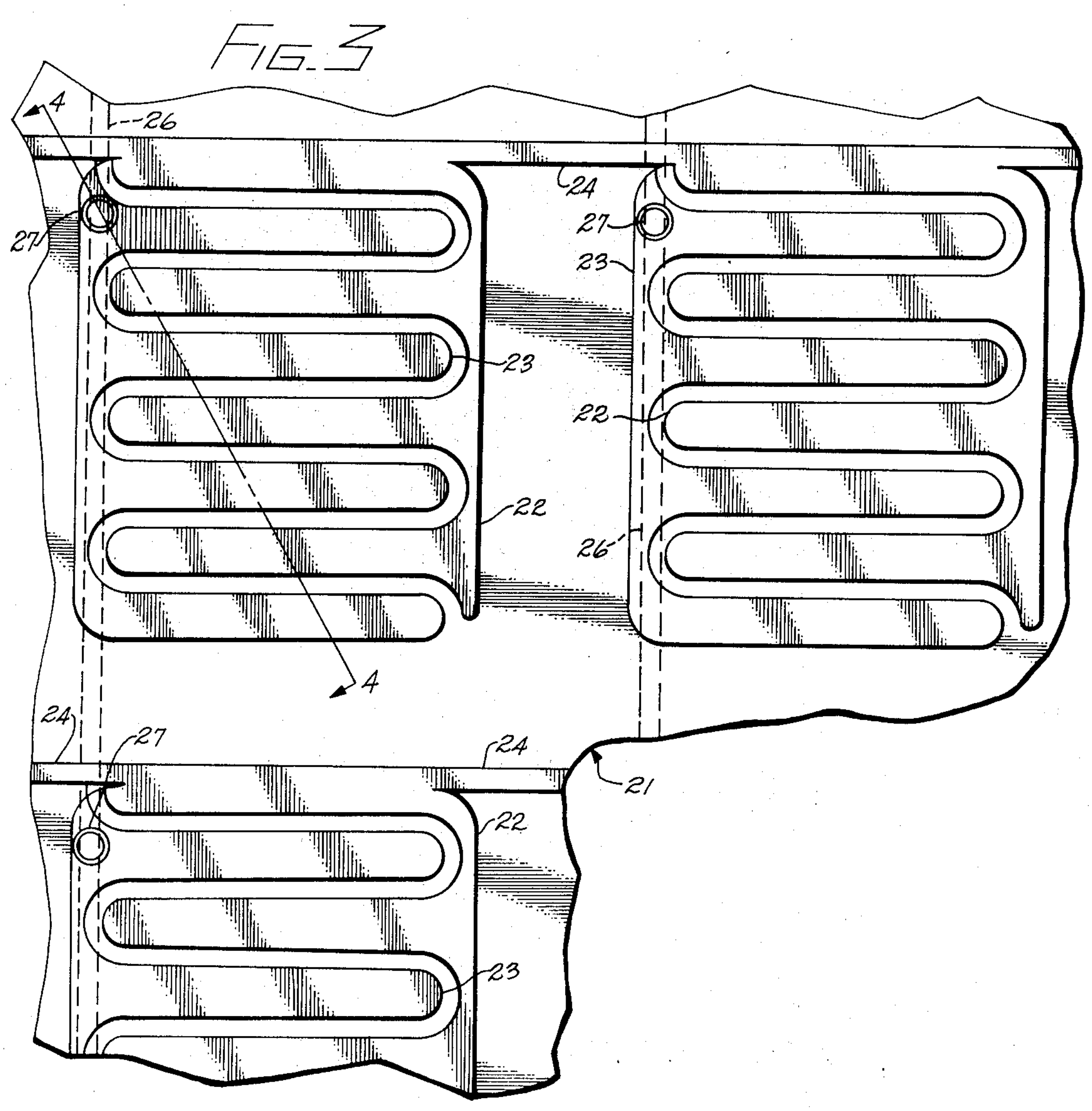
FIG. 3 illustrates in plan view a conductor arrangement for keys of the keyboard of FIG. 2.
Figure 4:
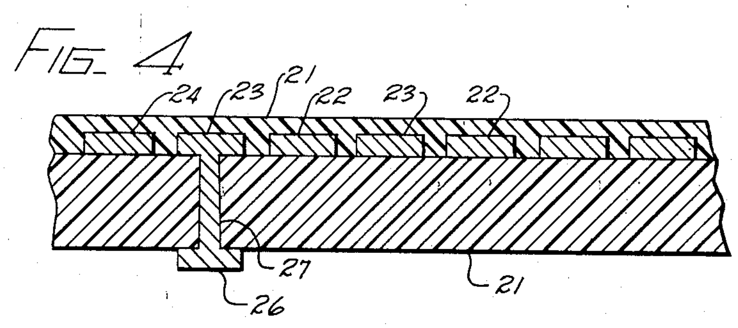
FIG. 4 is a cross section of a key as illustrated in FIG. 3.

As pointed out hereinabove, the individual keys 10 of the matrix are connected to one column and one row. A structure for providing capacitive coupling and connection to other keys of a column and a row according to principles of this invention is illustrated in FIGS. 3 and 4. As illustrated in this embodiment, each key of the matrix is preferably formed of layers on a conventional printed circuit board, formed largely of a plastic or other insulating substrate 21. The capacitive coupling portion of the key comprises an arrangement of metallic conductors on the front or upper surface of the substrate 21. A forked conductive region 22 having a plurality of branches, tines, or fingers extends over most of the active area of the key. Interleaved between the branches of the first conductive area 22 are branches of a second forked conductive area 23. A lead 24 extends along one edge of the first conductive area 22 on one key and thence along the front surface of the substrate 21 to a corresponding edge of a corresponding first conductive area 22 on an adjacent key on the printed circuit board. The lead 24 is integral with the several conductive areas 22 in a row of the matrix, and thereby provides the electrical connection between the several keys of the row and the oscillator sense amplifier (FIG. 2) for that row.

Electrical connection is made between the keys in a column by a lead 26 extending along the back or opposite surface of the substrate 21 from the conductive areas forming the keys. A through-the-board connection 27, such as a conventional plated-through hole, is provided between the column lead 26 and the second conductive area 23. In this manner the lead 26 for each column in the matrix is connected to the keys of that column. Since the row lead 24 is one surface of the substrate and the column lead is on the opposite surface, they can cross without interference.

An insulating film 28 (FIG. 4) is applied over the conductive members 22, 23 and 24 on the face of the printed circuit board. The insulating film 28 is thin so that the finger of a machine operator when touching the key is in close proximity to the conductive areas 22 and 23, and hence is closely capacitively coupled thereto for detuning the oscillating networks in the corresponding column and row of the matrix. Although not specifically illustrated herein, it will be apparent that the surface film may include indicia showing the values of specific keys and may include raised and lowered areas for providing tactile sensing of key location.

Figure 5:
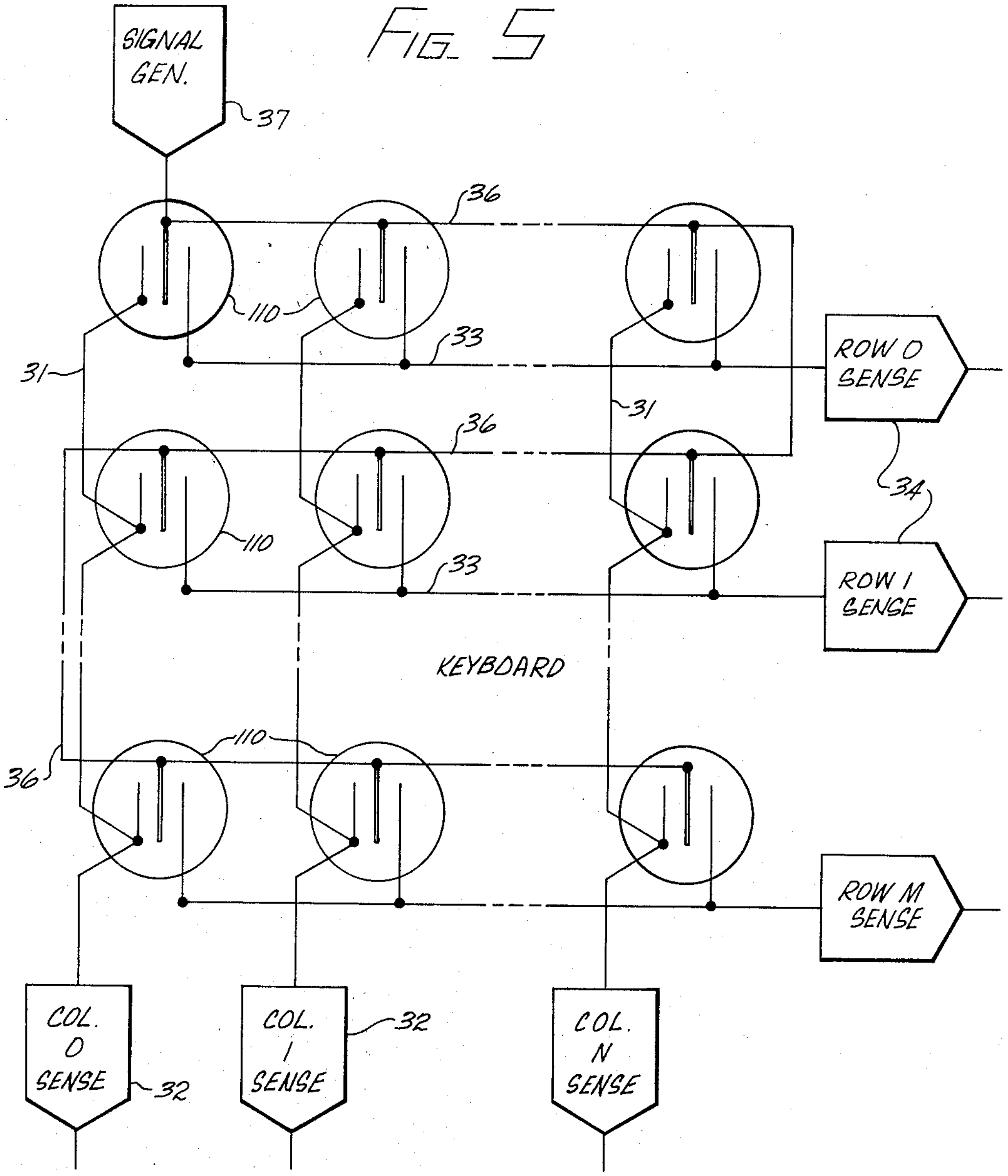
FIG. 5 is another embodiment of electronic arrangement of a keyboard constructed according to principles of this invention.

FIG. 5 illustrates schematically another keyboard arrangement constructed according to principles of this invention. As illustrated in this embodiment, there are a plurality of keys 110 on the keyboard in a plurality of columns 0, 1,. . . N, and in a plurality of rows 0, 1,. . . M. An electrical connection 31 is provided between each of the keys 110 in each column and a sensor 32 for each column. In a similar manner, an electrical connection 33 is provided between each of the keys in a row of the matrix and a sensor 34 for each row. A third electrical connection 36 is provided from a signal generator 37 to all of the keys of the matrix. The signal generator 37 may be a conventional pulse generator or oscillator so that a high frequency (e.g. 10 megacycles) signal is applied to all of the keys of the matrix. When an operator's finger touches or closely approaches a key 110, the capacitive coupling between the high frequency signal applied to the key by the lead 36 is capacitively coupled to the leads 31 and 33 connected to the key so touched. The presence of oscillation in the column and row is detected by the respective column and row sensors 32 and 34 to indicate the actuation of the touched key. The signals from the sensors are decoded and otherwise handled in substantially the same manner as the signals generated in a keyboard described and illustrated in FIG. 2.

The sensors 32 and 34 can be any convenient detector of oscillation and may merely be a conventional amplifier and rectifier. This would provide a signal when there is oscillation on a line of the matrix and no signal when there was no oscillation.

Figure 7:
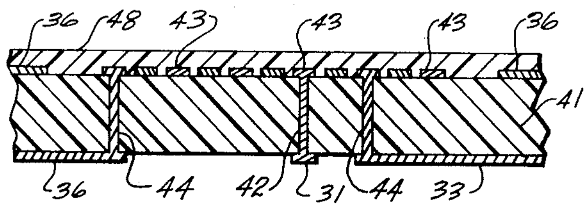
FIG. 7 is a cross sectional view of one of the keys of FIG. 6.
Figure 6:
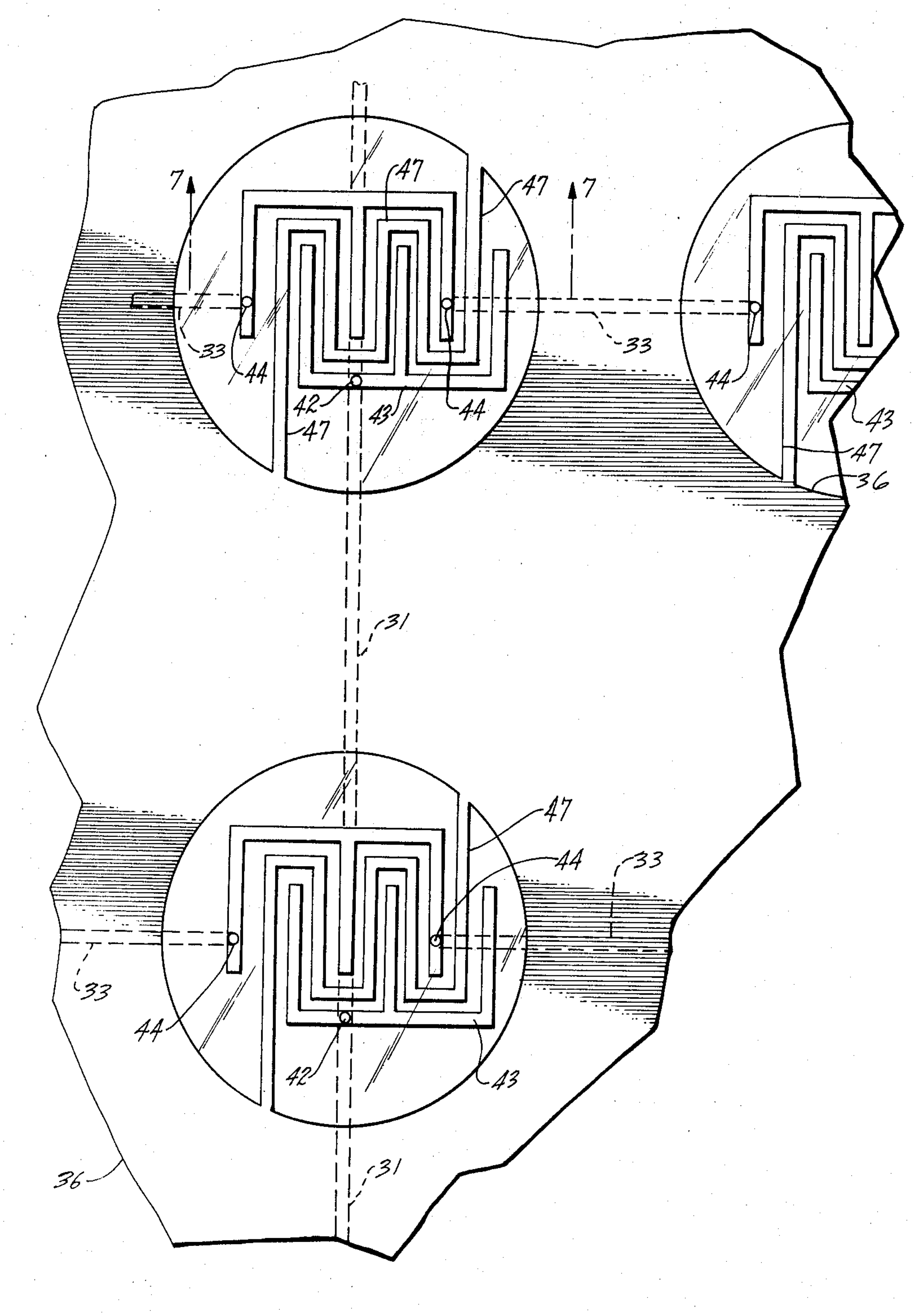
FIG. 6 illustrates in plan view the arrangement of a key arrangement for the keyboard of FIG. 5.

FIGS. 6 and 7 illustrate structure of keys constructed according to principles of this invention for obtaining capacitive coupling between a lead carrying a signal and leads connected to the column and row sensors. As illustrated in this embodiment, the keys are formed as conductive layers on a front surface of a printed circuit board substrate 41. A continuous lead 31 is provided along the reverse side of the substrate 41 interconnecting the keys 110 in each column. The column lead 31 is connected through the substrate 41 by a through-the-board connection 42 which is connected to a forked conductive area 43 on the front surface of the substrate for each key.

The row lead 33 is also arranged along the reverse side of the substrate 41 and is connected through the board by a connector 44 to connect to a second forked conductive area 46 on the front surface of the printed circuit board and having branches interleaved with branches of the first conductive area 43. The through-the-board connector 44 is connected to one edge of the forked area 46 at the end of one segment of a row lead 33. A second through-the-board lead 44 is provided on the opposite edge of the conductive area 46 to connect to the end of another segment of the row lead 33. Thus the lead 33 for each row of the matrix is intermittent on the reverse side of the printed circuit board and is maintained in continuity by a pair of through-the-board leads 44 and the forked conductive area 46 on the front face of the board. In this manner the row leads 33 are crossed over the column leads 31 running transverse thereto on the reverse side of the substrate.

Between the interleaved branches of the forked conductive area 43 connected to the column, and the forked conductive area 46 connected to the row, there is provided an additional sinuous conductive area 47, the ends of which are continuous with a substantially continuous metal layer on the front surface of the printed circuit board. This layer forms the lead 36 connecting the signal generator 37 to the several keys. The keys in this embodiment are open areas in the conductive layer or lead 36. It will be apparent, of course, that if desired lines of conductive material interconnecting the sinuous paths 47 can be employed instead of the broader area illustrated to form the lead 36 to the signal generator. A thin insulating layer 48 is provided over the conductors on the front face of the substrate 41 so that as an operator's finger touches or closely approaches the front face of the printed circuit board, there is capacitive coupling between the sinuous conductor 47 and the two forked conductive areas 43 and 46 electrically connected to the column and row sensors 32 and 34, respectively.

Figure 8:
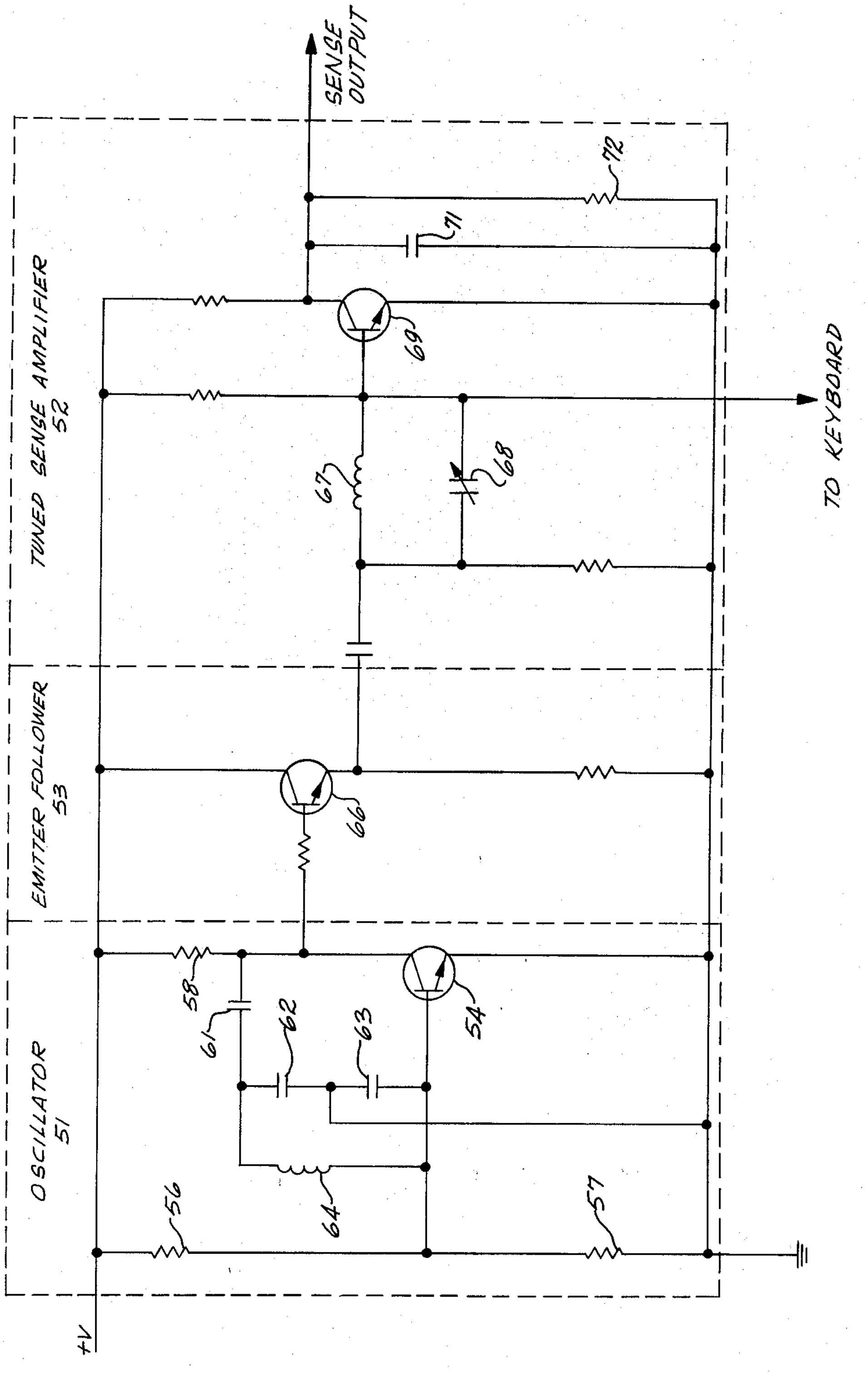
FIG. 8 is a typical circuit diagram for a tuned oscillation useful in the embodiment of FIG. 2.

FIG. 8 illustrates a typical oscillator sense amplifier circuit such as may be employed in a keyboard, as illustrated in FIG. 2. As illustrated in this embodiment, the oscillator sense amplifier comprises an oscillator 51 coupled to a tuned sense amplifier 52 by an emitter follower 53. The oscillator 51 comprises an NPN transistor 54 suitably biased by resistors 56, 57 and 58. An L-C series-parallel tank formed of capacitors 61, 62 and 63 and inductance 64 is coupled to the base of the transistor 54. This oscillator network has values chosen to oscillate stably at about 10 megacycles, although the exact frequency of oscillation is not critical. The collector of the oscillator transistor 54 is coupled to the base of an NPN transistor 66 of the emitter follower 53 in a conventional manner.

The emitter of the transistor 66 is coupled to an L-C circuit formed of an inductance 67, variable capacitor 68, and the capacitance of the keys on the keyboard. As pointed out hereinabove, the keys on the keyboard are, in effect, capacitors having a selected capacitance when the operator's finger is not near a key in the selected row or column to which the oscillator sense amplifier is connected, and a different capacitance when a key is approached or touched by an operator's finger. The L-C circuit of the tuned sense amplifier 52, including the capacitance of the keyboard connection, is coupled to the base of an NPN transistor 69. The collector of the transistor is the sense output of the oscillator sense amplifier going to one of the decoders 15 of FIG. 2. The collector of the transistor 69 is also coupled to ground by a capacitor 71 and a resistor 72.

In operation, the oscillator 51 applies a steady oscillation of about 10 megacycles to the tuned L-C circuit of the sense amplifier 52 by way of the emitter follower 53. The tuned circuit of inductance 67, tuned capacitor 68, and keys in a row or column of the keyboard is tuned prior to use to oscillate at the oscillator frequency by the variable capacitor 68. The presence of oscillation in this circuit causes a a selected voltage level to appear at the collector of the transistor 69 as integrated or filtered by the capacitor 71 and resistor 72 so that the oscillator sense amplifier output is a substantially steady state voltage. When the tuned amplifier L-C circuit is detuned by approach of an operator's finger to a key of the keyboard, oscillation ceases and the bias on the transistor 69 stops its conduction so that a different voltage level appears at the sense output. The oscillator sense amplifier is thus capable of indicating by two voltage states the proximity or lack of proximity of an operator's finger to a key on the keyboard because of the changed capacitance of a tuned L-C circuit.

Although two examples of electronic keyboard and keys constructed according to principles of this invention have been described and illustrated, it will be apparent that many modifications and variations can be made in the detailed structure. Thus, for example, other components and logical arrangements may be substituted in the electronic keyboard for obtaining output signals uniquely characteristic of keys closely approached or touched by an operator.

What is claimed is:

1. An electronic keyboard comprising:
- a matrix of keys in a plurality of columns and a plurality of rows, each key defining an intersection between a column and a row;
- a first conductive area on each key adjacent a surface thereof adapted to be manually contacted;
- means for interconnecting the first conductive areas on the keys in each column of the matrix;
- a second conductive area on each key adjacent the surface adapted to be manually contacted;
- means for interconnecting the second conductive areas on the keys in each row of the matrix;
- means connected to at least one of the conductive areas for establishing a selected electronic oscillation in each key of the matrix, whereby capacitive coupling of the respective conductive areas is changeable by manually contacting a key for thereby changing the oscillation in the contacted key;
- means for detecting the change in oscillation in each column and each row of the matrix; and
- a plurality of decoders, each of the decoders corresponding to a key in the matrix, and connected to the column and to the row in which the corresponding key is located.

2. A keyboard as defined in claim 1 wherein the first conductive area comprises a forked conductor having a plurality of branches; and
- the second conductive area comprises a second forked conductor having a plurality of branches interleaved with the branches of the first forked conductor so that the first and second conductors each extend over substantially all of the extent of the key.

3. An electronic keyboard comprising:
- a matrix of keys in a plurality of columns and a plurality of rows, each key defining an intersection between a column and a row;
- a first conductive area on each key adjacent a surface thereof adapted to be manually contacted;
- means for interconnecting the first conductive areas on the keys in each column of the matrix;
- a second conductive area on each key adjacent the surface adapted to be manually contacted;
- means for interconnecting the second conductive areas on the keys in each row of the matrix;
- a third conductive area on each key adjacent a surface thereof adapted to be manually contacted; and wherein
- one conductive area comprises a forked conductor having a plurality of branches;
- another conductive area comprises a second forked conductor having a plurality of branches interleaved with the branches of the first forked conductor so that the first and second conductors each extend over substantially all of the extent of the key; and
- still another conductive area comprises a third conductor sinuously interposed between branches of the first forked conductor and branches of the second forked conductor;
- means connected to at least one of the conductive areas for establishing a selected electronic oscillation in each key of the matrix, whereby capacitive coupling of the respective conductive areas is changeable by manually contacting a key for thereby changing the oscillation in the contacted key;
- means for detecting the change in oscillation in each column and each row of the matrix; and
- a plurality of decoders, each of the decoders corresponding to a key in the matrix, and connected to the column and to the row in which the corresponding key is located.

4. An electronic keyboard as defined in claim 3 wherein the means for establishing oscillation comprises a signal generator electrically connected to the third conductor.

5. An electronic keyboard comprising:
- a matrix of keys in a plurality of columns and a plurality of rows, each key defining an intersection between a column and a row;
- a first conductive area on each key adjacent a surface thereof adapted to be manually contacted;
- means for interconnecting the first conductive areas on the keys in each column of the matrix;
- a second conductive area on each key adjacent the surface adapted to be manually contacted;

means for interconnecting the second conductive areas on the keys in each row of the matrix;

means connected to at least one of the conductive areas for establishing a selected electronic oscillation in each key of the matrix, whereby capacitive coupling of the respective conductive areas is changeable by manually contacting a key for thereby changing the oscillation in the contacted key;

means for detecting the change in oscillation in each column and each row of the matrix;

a plurality of decoders, each of the decoders corresponding to a key in the matrix, and connected to the column and to the row in which the corresponding key is located;

a plurality of threshold means for detecting a liminal time interval of existence of change in oscillation one of the threshold means being connected to each of the decoders for rejecting changes of less than a selected liminal time interval; and a binary encoder connected to the decoders for converting signals thereon to a binary code.

6. An electronic keyboard comprising:

a matrix of keys in a plurality of columns and a plurality of rows, each key defining an intersection between a column and a row;

a first conductive area on each key adjacent a surface thereof adapted to be manually contacted;

means for interconnecting the first conductive areas on the keys in each column of the matrix;

a second conductive area on each key adjacent the surface adapted to be manually contacted;

means for interconnecting the second conductive areas on the keys in each row of the matrix;

means connected to at least one of the conductive areas for establishing a selected electronic oscillation in each key of the matrix, whereby capacitive coupling of the respective conductive areas is changeable by manually contacting a key for thereby changing the oscillation in the contacted key;

means for detecting the change in oscillation in each column and each row of the matrix; and a plurality of decoders, each of the decoders corresponding to a key in the matrix, and connected to the column and to the row in which the corresponding key is located; and wherein each key further comprises a nonconductive substrate; and the first conductive area comprises a first forked conductive portion having a plurality of branches on a first side of the substrate;

the means for interconnecting the first conductive areas comprises a continuous conductor on the opposite side of the substrate from the conductive areas, and a conductor extending through the substrate between the continuous conductor and the first conductive portion;

the second conductive area comprises a second forked conductive region having a plurality of branches interleaved with branches of the first forked conductive area on the first surface of the substrate;

the means for interconnecting the second conductive areas a first conductive segment on the opposite side of the substrate from the conductive areas and extending from the key in a first direction along a row of the matrix, a conductor extending through the substrate and interconnecting the first conductive segment and a portion of the second conductive region, a second conductive segment on the opposite side of the substrate from the conductive areas and extending from the key in a direction along the row opposite from the direction of extension of the first conductive segment, and a conductor extending through the substrate and interconnecting the second conductive segment and a portion of the second conductive region remote from the other connection thereto;

each key further comprising:

a third conductive region sinuously interposed between the interleaved branches of the first and second conductive regions; and a conductor on the first side of the substrate for electrically connecting the third conductive region on the key to similar third conductive areas on adjacent keys.

7. An electronic keyboard as defined in claim 6 wherein:

the means for establishing oscillation comprises a signal generator electrically connected to the third conductor for establishing oscillations therein;

the means for detecting a change comprises an oscillation sensor connected to the means for interconnecting the first conductive areas on each column of the matrix, and an oscillation sensor connected to the means for interconnecting the second conductive areas in each row of the matrix;

each of the decoders being connected to a unique pair of a sensor for a column and a sensor for a row of the matrix for providing an output signal uniquely characteristic of a key at the intersection between the column and the row of the unique pair; and further comprising:

a plurality of threshold means for detecting a liminal time interval of existence of change in oscillation, one of the threshold means being connected to each of the decoders for rejecting changes of less than the selected liminal time interval; and a binary encoder connected to the decoders for converting signals thereon to a binary code.

8. In an electronic keyboard wherein manual approach to a key is detected by capacitive coupling to key elements, an improved key comprising:

an insulating substrate;

a first forked conductive area having a plurality of branches on a first side of the substrate;

a second forked conductive area having a plurality of branches interleaved with branches of the first forked conductive area on the first side of the substrate;

first means for connecting the first conductive area to a similar first conductive area on a second key adjacent the improved key in a first direction comprising a continuous conductor on the opposite side of the substrate from the conductive areas; and a conductor extending through the substrate between the continuous conductor and the first conductive area; and second means for connecting the second conductive area with a similar second conductive area on a third key adjacent the improved key in a second direction angulated relative to the first direction comprising:

a first conductive segment on the opposite side of the substrate from the conductive areas, and extending from the improved key in a first direction, a conductor extending through the substrate and interconnecting the first conductive segment and a portion of the second conductive area, a second conductive segment on the opposite side of the substrate from the conductive areas and extending from the improved key in a direction opposite from the direction of extension of the first conductive segment, and a conductor extending through the substrate and interconnecting the second conductive segment and a portion of the second conductive area remote from the other connection thereto.

9. In an electronic keyboard as defined in claim 8 an improved key further comprising:

a third conductor sinuously interposed between the interleaved branches of the first and second conductive areas; and a conductor on the first side of the substrate for electrically connecting the third conductive area on the improved key to similar conductive areas on adjacent keys.

* * * * *